United States Patent [19]

Taylor et al.

[11] Patent Number: 4,462,568

[45] Date of Patent: Jul. 31, 1984

[54] VALVE CONSTRUCTION AND METHOD OF MAKING THE SAME

[75] Inventors: Charles W. Taylor, Batavia; Everett J. DeJager, Cincinnati, both of Ohio

[73] Assignee: Xomox Corporation, Cincinnati, Ohio

[21] Appl. No.: 357,974

[22] Filed: Mar. 15, 1982

[51] Int. Cl.³ ............................................. F16K 31/44
[52] U.S. Cl. .............................. 251/335 A; 251/214; 277/188 R; 277/188 A
[58] Field of Search ............... 277/112, 188 R, 188 A; 251/214, 335 A

[56] References Cited

U.S. PATENT DOCUMENTS

| | | | |
|---|---|---|---|
| 2,032,316 | 2/1936 | Cotton | 251/335 A |
| 3,235,272 | 2/1966 | Russell | 277/58 |
| 3,294,408 | 12/1966 | Smith | 277/188 R |
| 3,351,350 | 11/1967 | Shepler | 277/188 R |
| 3,477,730 | 11/1969 | Szcupak et al. | 277/188 R |
| 3,521,856 | 7/1970 | Smith | 251/214 |
| 4,140,322 | 2/1979 | Nyman | 277/188 R |
| 4,169,604 | 10/1979 | Heathcortt | 277/125 |
| 4,333,632 | 6/1982 | Smith | 251/214 |

FOREIGN PATENT DOCUMENTS

| | | |
|---|---|---|
| 1344415 | 2/1964 | France . |
| 1398703 | 9/1965 | France . |
| 1301742 | 1/1973 | United Kingdom . |

OTHER PUBLICATIONS

European Search Report Application No. EP 8363009.2, Place of Search, Vienna, Date of Completion of Search, 29-06-1983, Examiner: Roussarian.

*Primary Examiner*—A. Michael Chambers
*Attorney, Agent, or Firm*—Kinney and Schenk

[57] ABSTRACT

A valve construction and method of making the same are provided, the valve construction comprising a housing having a valve chamber therein, a valve member rotatably carried by the housing in the valve chamber thereof and having a valve stem extending from the chamber, and a seal unit carried by the housing to prevent leakage from the valve chamber to the exterior of the housing and having an annular seal member sealing against and completely around the stem while permitting rotational movement therebetween, the seal unit comprising a pair of annular metallic retainers press-fitted together in telescoping relation and holding the annular seal member therebetween in compressed sealed relation therewith.

25 Claims, 5 Drawing Figures

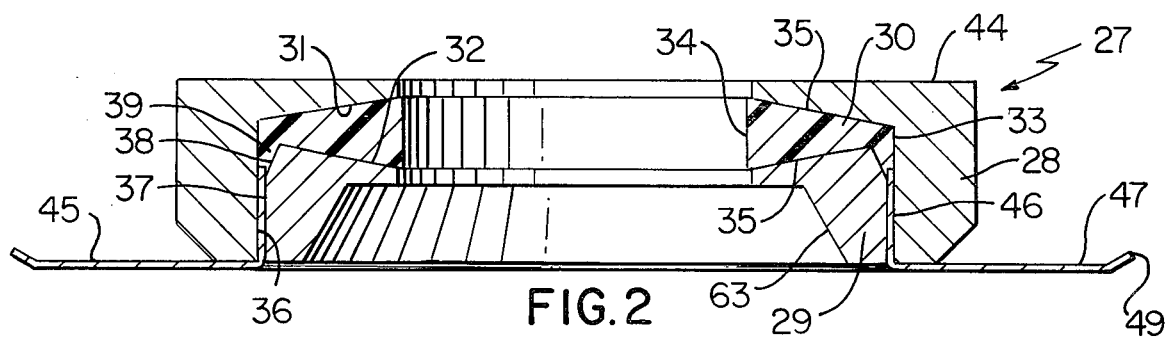
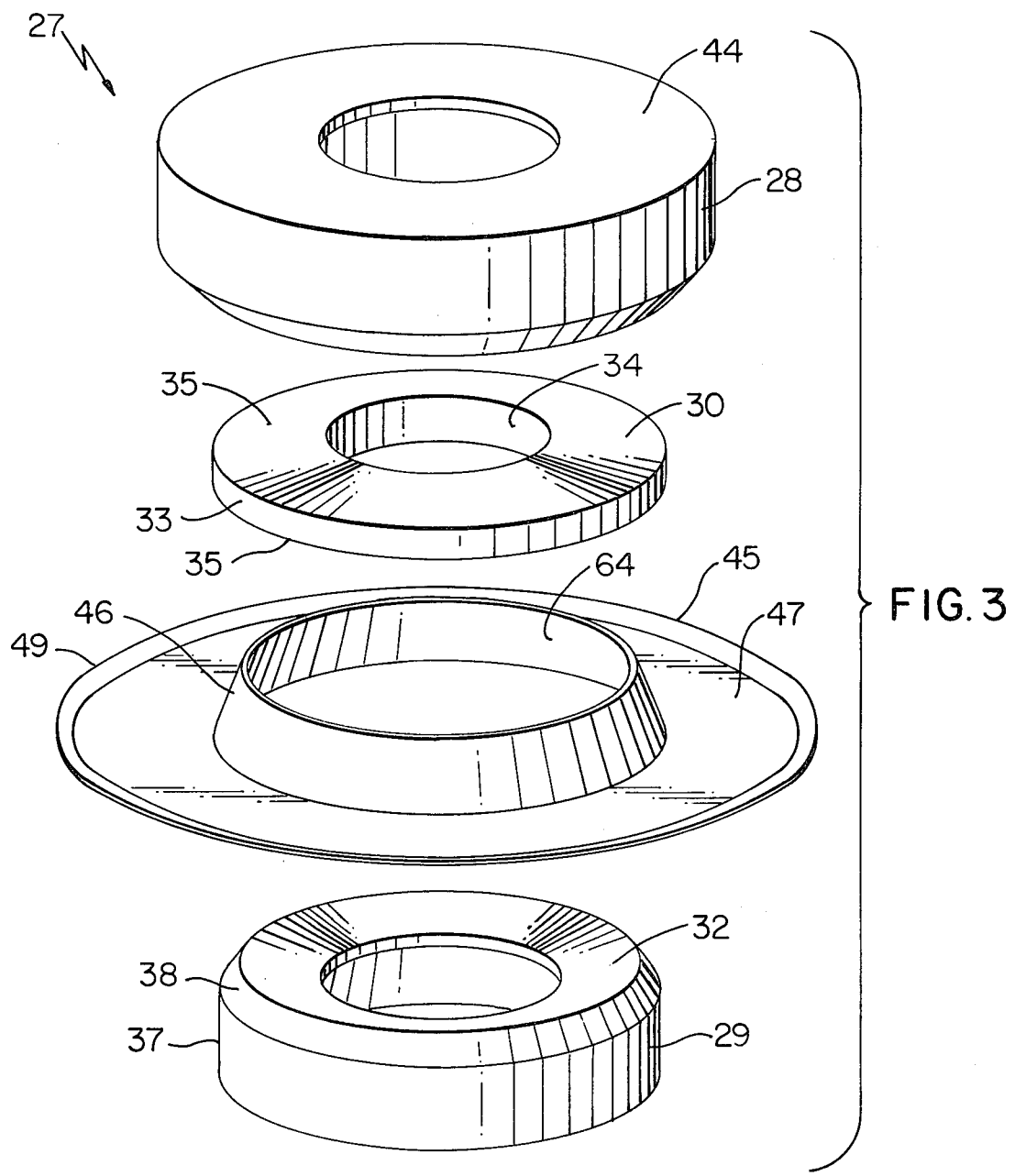

VALVE CONSTRUCTION AND METHOD OF MAKING THE SAME

BACKGROUND OF THE INVENTION

1. Field of the Invention

This invention relates to an improved valve construction having improved seal means therefor as well as to a method of making such a valve construction.

2. Description of the Prior Art

It is known to provide a valve construction that comprises a housing means having a valve chamber therein, a valve means rotatably carried by the housing means in the valve chamber thereof and having a valve stem extending from the valve chamber, and seal means carried by the housing means to prevent leakage from the chamber to the exterior of the housing means and having an annular seal member sealing against and completely around the stem while permitting rotational movement therebetween.

SUMMARY OF THE INVENTION

It is one feature of this invention to provide an improved valve construction which has improved seal means therefor.

In particular, it was found according to the teachings of this invention that the seal means for sealing the valve stem of a valve means so as to prevent leakage from the valve chamber to the exterior of the housing means carrying the valve means can be formed in a unique manner to prevent such leakage even in the event that an external fire or other adverse event has destroyed the conventional polymeric seal structure of the seal means whereby the improved seal means of this invention is substantially fireproof.

For example, one embodiment of this invention provides a valve construction comprising a housing means having a valve chamber therein, a valve means rotatably carried by the housing means in the valve chamber thereof and having a valve stem extending from the valve chamber, and seal means carried by the housing means to prevent leakage from the chamber to the exterior of the housing means and having an annular seal member sealing against and completely around the stem while permitting rotational movement therebetween, the seal means comprising a pair of annular metallic retainers press-fitted together in telescoping relation and holding the annular seal member therebetween in compressed sealed relation therewith.

Accordingly, it is an object of this invention to provide an improved valve construction having one or more of the novel features of this invention as set forth above or hereinafter shown or described.

Another object of this invention is to provide an improved method of making such a valve construction, the method of this invention having one or more of the novel features of this invention as set forth above or hereinafter shown or described.

Other objects, uses, and advantages of this invention are apparent from a reading of this description which proceeds with reference to the accompanying drawings forming a part thereof and wherein:

BRIEF DESCRIPTION OF THE DRAWINGS

FIG. 2 is a cross-sectional view of the improved seal sub-assembly of this invention utilized for part of the seal means of the valve construction of FIG. 1.

FIG. 3 is an exploded perspective view of the parts of the seal sub-assembly illustrated in FIG. 2.

DESCRIPTION OF THE PREFERRED EMBODIMENT

Figure 1:
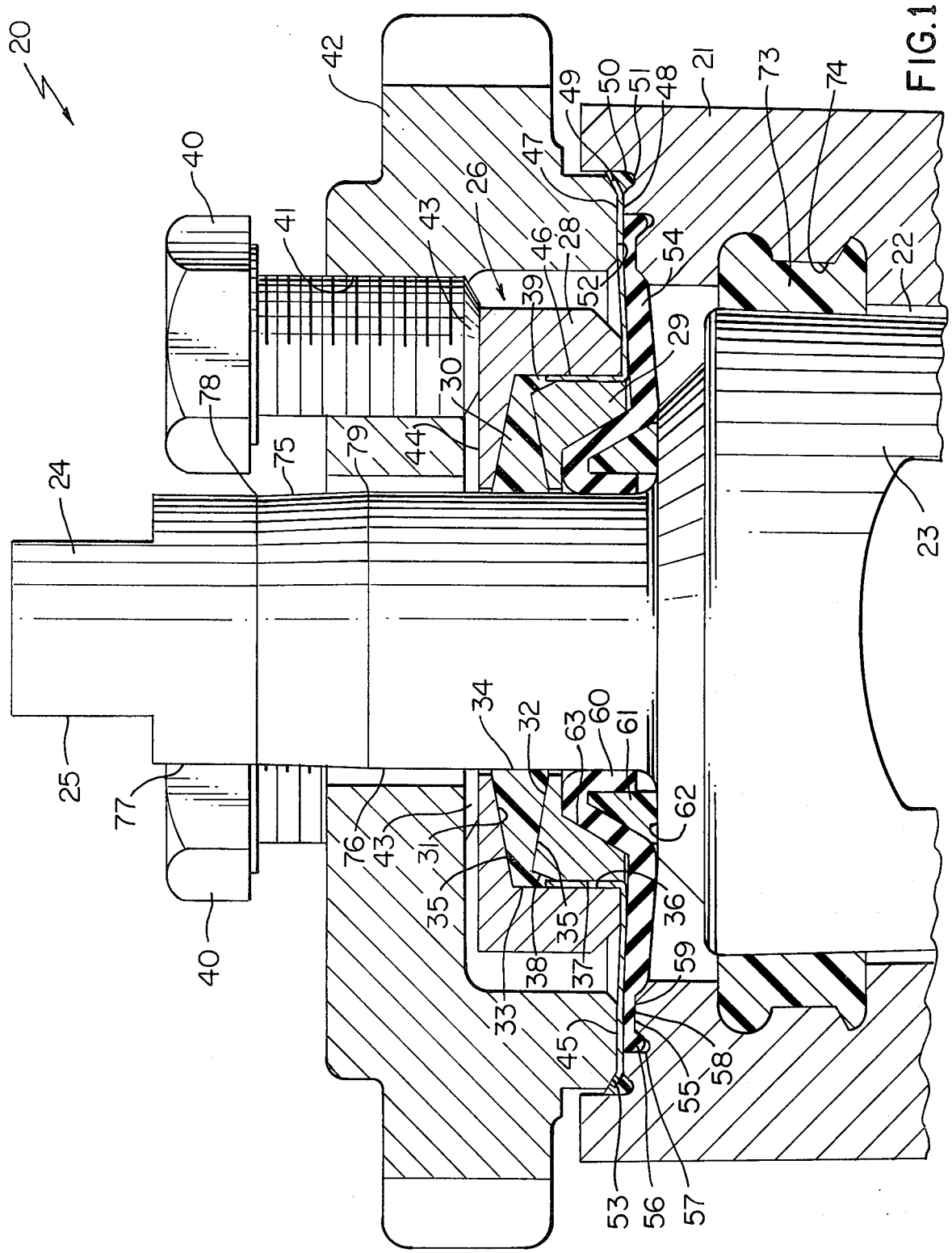
FIG. 1 is an enlarged fragmentary cross-sectional view of the improved valve construction of this invention.

While the various features of this invention are hereinafter illustrated and described as providing a fire-safe top seal means for a particular valve construction, it is to be understood that the various features of this invention can be utilized singly or in any combination thereof to provide other types of seal means for other types of valve constructions as desired.

Therefore, this invention is not to be limited to only the embodiment illustrated in the drawings, because the drawings are merely utilized to illustrate one of the wide variety of uses of this invention.

Referring now to FIG. 1, the improved valve construction of this invention is generally indicated by the reference numeral 20 and comprises a housing means 21 having a valve chamber 22 therein that rotatably receives a valve member 23 therein in a manner well known in the art, such as in a plug valve construction or the like, the valve member 23 having a valve stem or shank 24 extending from the valve chamber 22 and being provided with a flattened end 25 to which suitable hub and wrench structure (not shown) or the like can be attached for rotating the valve member 23 to various operating positions in the valve chamber 22 of the housing means 21 to control fluid flow therethrough in a manner well known in the art and for any desired purpose.

The valve construction 20 includes improved seal means of this invention that is generally indicated by the reference numeral 26 in the drawings and is utilized for preventing fluid leakage from the chamber 22 to the exterior of the housing means 21 by sealing against and completely around the valve stem 24 and to the housing means 21 in a manner hereinafter set forth.

In addition, the sealing means 26 of this invention uniquely provides a substantially fire-safe top seal means for the valve construction 20 so that even if the polymeric sealing parts thereof are destroyed by fire, high temperatures or other adverse effects, the improved seal means 26 of this invention will still prevent fluid leakage from the valve chamber 22 to the exterior of the housing means 21 so that such fluid controlled by the valve construction 20 can not provide a hazard itself, such as feeding a fire that caused the partial destruction of the seal means 26 in the first place should such fluid be a flammable liquid such as a petroleum product or the like.

The seal means 26 of this invention includes a self-contained seal sub-assembly that is generally indicated by the reference numeral 27 in FIGS. 2 and 3 and will now be described.

The seal sub-assembly 27 comprises a pair of annular metallic retainers or thrust collar rings 28 and 29 adapted to be press-fitted together in a telescoping relation in a manner hereinafter set forth to hold an annular seal member 30 between tapering surfaces 31 and 32 of the respective retainers 28 and 29, the tapering surfaces 31 and 32 tapering towards each other as the surfaces 31 and 32 extend in a direction substantially transversely away from the valve stem 24 as illustrated in FIG. 1.

While the annular seal member 30 can be formed of any suitable material that will provide a seal function and be substantially fireproof, one embodiment of the seal means 26 of this invention that has proved satisfactory has the annular seal member 30 made from a material that is substantially pure graphite and that is sold under the Trademark "Grafoil" by the Union Carbide Corporation of 270 Park Avenue, New York, N.Y.

The annular seal member 30 has a substantially trapezoidal cross-sectional configuration that defines opposed large and small bases 34 and 33 thereof joined together by angled sides 35 which respectively are disposed in engaging sealing relation with the tapering sides 31 and 32 of the retainers 28 and 29, the large base 34 being disposed inboard of the retainers 28 and 29 for its sealing purpose as will be apparent hereinafter.

The outer ring or retainer 28 has an annular surface 36 intersecting with the tapering surface 31 thereof and being substantially concentrically disposed relative to the stem 24 as illustrated in FIG. 1.

The inner ring or retainer 29 also has a surface 37 that is adapted to face the surface 36 of the outer retainer 28 and intersects with the tapering surface 32 thereof, the surface 37 generally being concentrically and facing outwardly from the stem 24 as illustrated in FIG. 1 but having an angled portion 38 thereof adjacent the surface 32 thereof for permitting a portion 39 of the annular seal member 30 to be forced between the portion 38 of the surface 37 of retainer 29 and the facing surface 36 of the retainer 28 as illustrated in FIG. 1 when the seal member 30 is compressed between the retainers 28 and 29 not only during the assembling of the retainer 29 within the retainer 28 in a manner hereinafter set forth, but also when the seal sub-assembly 27 is forced onto the stem 24 into the position illustrated in FIG. 1.

The seal sub-assembly 27 is adjusted in the valve construction by adjusting screws 40 threadedly carried in threaded bores 41 in a cover member 42 of the housing means 21 which are subsequently turned in a tightening direction to cause the ends 43 of the adjusting screws 40 to bear downwardly on the upper surface 44 of the retainer 28 to tend to move the seal sub-assembly 27 downwardly in FIG. 1 for a purpose hereinafter described.

The seal sub-assembly 27 includes a metallic diaphragm 45 having an inner peripheral portion 46 disposed in press-fit relation between the facing surfaces 36 and 37 of the press-fit retainers 28 and 29 while the outer peripheral portion 47 thereof is adapted to extend generally transversely away from the valve stem 24 to not only engage against an annular surface 48 of the housing means 21, but also to have its outer peripheral end 49 bearing against an annular sealing member 50 disposed in an annular groove 51 formed in the housing means 21 immediately adjacent and outboard of the surface 48 as illustrated in FIG. 1.

While the annular seal member 50 can be any suitable material which will provide a sealing function and be substantially fire-proof, in one embodiment of the seal means 26 of this invention, the annular seal means 50 is formed of the same material as the annular seal member 30 previously described.

Also, while the metal diaphragm 45 can be formed of any suitable meterial and of any suitable thickness in order to be substantially fire-proof, it has been found that the same can comprise stainless steel and be shaped into the configuration illustrated in FIG. 1 in a manner hereinafter set forth.

The outer peripheral portion 47 of the metal diaphragm 45 is held against the annular surface 48 of the housing means 21, as well as against the annular seal member 50, by a cooperating surface 52 on the cover member 42 which has an annular beveled edge 53 which mates with the pre-bent and angled peripheral end 49 of the metal diaphragm 45 as illustrated in FIG. 1 to mate with the annular surface 48 and the annular seal member 50 when the cover member 42 is bolted by suitable bolts (not shown) against the housing means 21 as illustrated in FIG. 1 to permit the threaded adjusting means 40 to adjust its compressive force on the seal means 26 for the sealing purpose previously described.

The sealing means 26 includes a formed sealing diaphragm 54 having an outer peripheral portion 55 provided with an annular bead 56 received in an annular groove 57 formed in the housing means 21 outboard of an annular surface 58 thereof which is received in an annular groove 59 formed in the outer peripheral portion 55 of the diaphragm 54 as illustrated in FIG. 1, the annular groove 57 in the housing means 21 having sufficient clearance to permit radial outward expansion of the diaphragm 54 when under compression by the cover member 42 as will be apparent hereinafter whereby the groove 51 comprises an expansion groove for the diaphragm 54.

The diaphragm 54 has its inner peripheral portion 60 shaped to be disposed over an annular wedge shaped sealing ring 61 disposed on an annular shoulder 62 of valve member 23 so that the inner peripheral portion 60 of the diaphragm 54 forms a lip seal that is disposed in sealing engagement with the valve stem 24 as illustrated, the retainer 29 of the seal sub-assembly 27 having an internal substantially L-shaped annular surface 63 that cooperates with the inner peripheral portion 60 of the seal diaphragm 54 to hold the same against the annular wedge seal 61 and urge the same into sealing engagement with the valve stem 24 as illustrated.

While the flexible seal diaphragm 54 and the wedge seal member 61 can be formed of any suitable polymeric material to perform a sealing function to fluid seal the chamber 22 of the housing means 21 to the exterior of the valve construction 20 between the surface 58 of the housing means 21 and the valve stem 24, it has been found that the same can be formed of a plastic material sold under the Trademark "PTFE Teflon" and made by the E. I. DuPont de Nemours Company of 1007 Market Street, Wilmington, Del. If desired, such plastic material for the wedge ring or seal 61 can be glass filled.

Figure 4:
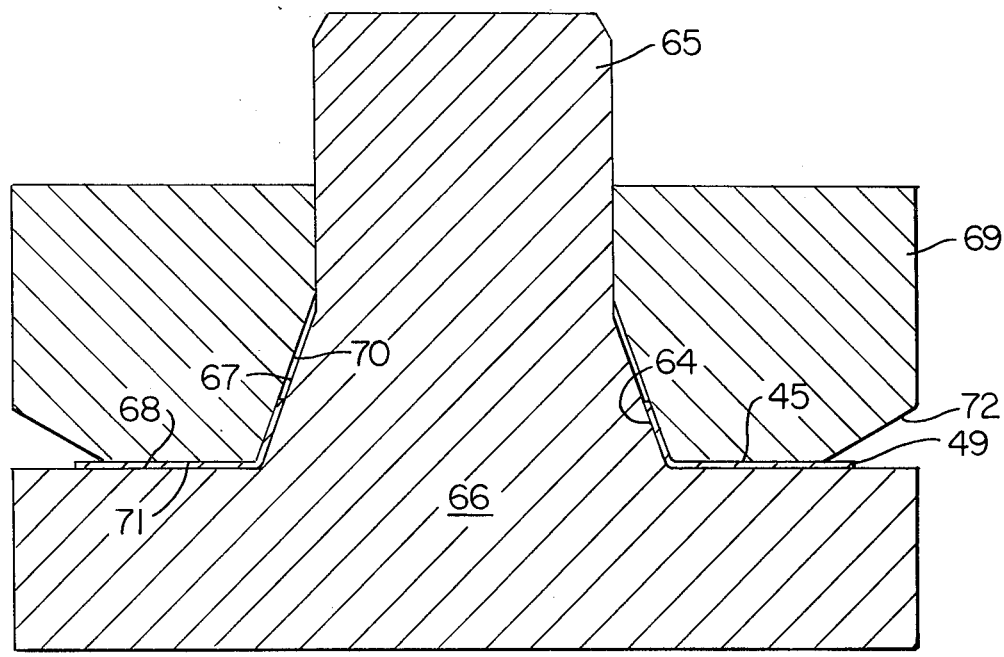
FIG. 4 is a schematic cross-sectional view illustrating one of the steps of this invention for making the metal diaphragm for the seal means of the valve construction of FIG. 1.
Figure 5:
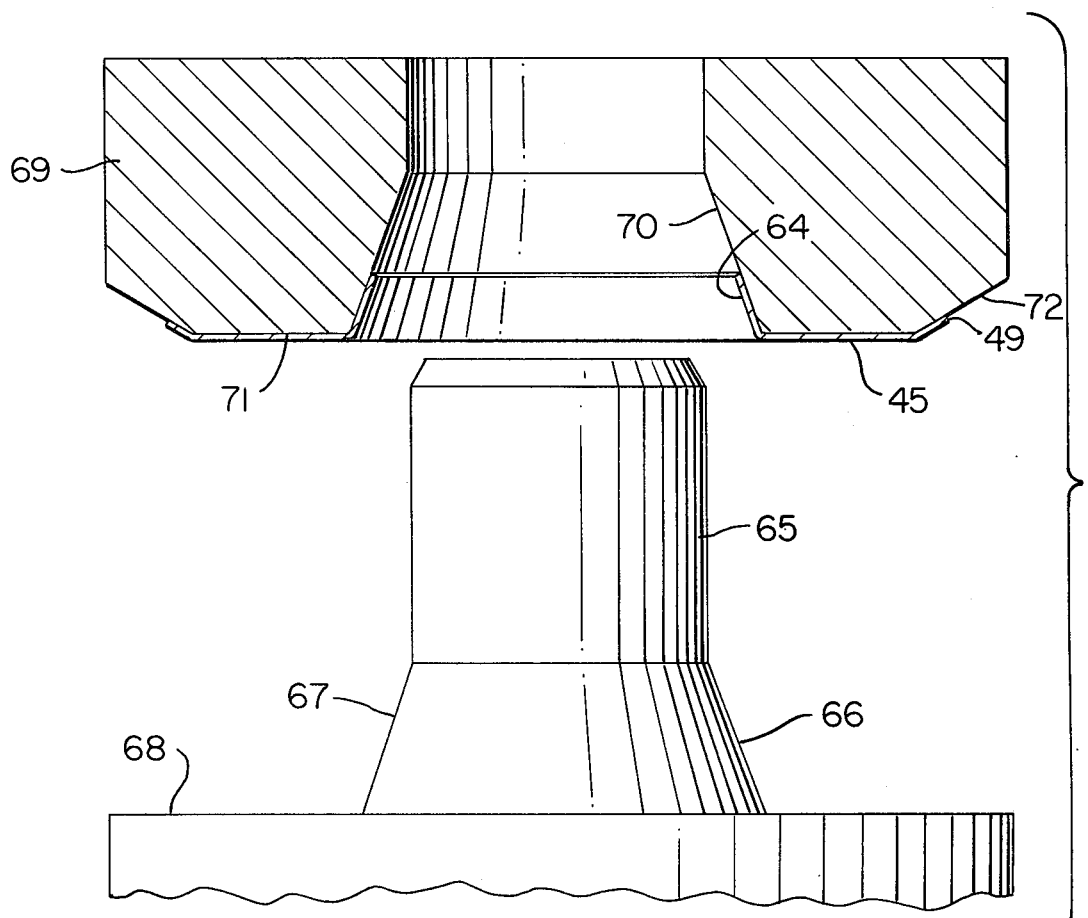
FIG. 5 is a view similar to FIG. 4 and illustrates another step in the method of this invention for making the metal diaphragm for the seal means of the valve construction of FIG. 1.

While the metal diaphragm 45 of this invention can be formed in any suitable manner into the configuration illustrated in FIGS. 1-3, one method of this invention for shaping the diaphragm 45 is illustrated in FIGS. 4 and 5 and will now be described.

As illustrated in FIG. 4, the metal diaphragm 45 has a central opening 64 formed therethrough so the same is adapted to be disposed over a cylindrical shank 65 of a male die member 66 having a frusto-conical section 67 joined to an outwardly directed flat annular portion 68 that shapes the metal diaphragm 45 into the configuration illustrated in FIG. 4 when a female die member 69 has its cooperating surface means that comprises an angled surface means 70 and annular flat surface means 71 respectively cooperating with the surfaces 67 and 68 of the male die member 66 when mated therewith as illustrated in FIG. 4.

Subsequently, when the male die member 66 is removed from the female die memebr 69, the outer peripheral end 49 of the metal diaphragm 45 can be formed against an angled surface 72 of the female die member 69 in any suitable manner, such as by tapping the same against the angled surface 72 with a suitable tool completely around the entire periphery of the diaphragm 45 in order to provide the pre-bent end 49 for the sealing purpose with the annular seal member 50 as previously described.

Thus it can be seen that even though the inner peripheral portion 46 of the preformed diaphragm 45 is initially angled at less than 90° with the outer peripheral portion 47 thereof when the diaphragm 45 is removed from the die members 66 and 69, the inner peripheral portion 46 of the diaphragm 45 is subsequently bent approximately 90° relative to the outer peripheral portion 47 thereof during the assembly of the inner peripheral portion 46 of the diaphragm 45 with the retainers 28 and 29 in their subsequent press-fit relation as illustrated in FIGS. 1 and 2.

Therefore, it can be seen that it is a relatively simple method of this invention to form the metal diaphragm 45 to permit the same to be assembled with the metal retainers 28 and 29 when the same are being press-fit together by initially disposing the inner peripheral portion 46 of the diaphragm 45 adjacent the surface 36 of the retainer 28 after the annular seal member 30 has been disposed in the retainer 28 against the surface 31 thereof whereby the subsequent telescoping of the retainer 29 in the retainer 28 not only press-fits the inner peripheral portion 46 of the diaphragm 45 in its secured relation between the retainers 28 and 29 in the subassembly 27, but also the press-fitting of the retainer 29 in the retainer 28 places the annular seal member 30 under compression between the surfaces 34 and 35 thereof to cause the portion 39 of the annular seal member 30 to be forced between the part 38 of the surface 37 of the retainer 29 and the surface 36 of the retainer 28 as previously set forth to firmly secure the annular seal member 30 therebetween.

Thus, it can be seen that it is a relatively simple method of this invention to form the seal sub-assembly 27 that is adapted to be utilized to form part of the seal means 26 of the valve construction 20 in a manner now to be described.

Before the valve member 23 is assembled in the valve chamber 22 of the housing means 21 to be rotatably supported therein by the conventional side seal means 73 carried in annular grooves 74 in the housing means 21 in a manner well known in the art, the annular wedge seal member 61 and the lip seal diaphragm 54 are placed on the shoulder means 62 of the valve member 23 in telescoped relation over the stem thereof and then the pre-formed self-contained sub-assembly 27 is forced down the stem 24 into the position illustrated in FIG. 1, the stem 24 having a unique tapered transition section 75 disposed between a large cylindrical section 76 thereof and a smaller cylindrical section 77 thereof to facilitate the press-fitting of the seal member 30 onto the stem section 76 that has a larger outer diameter than the normal inner diameter of the annular seal member 30.

In particular, upon the initial telescoping of the seal sub-assembly 27 onto the stem 24 of the valve member 23, the inner peripheral base 34 of the annular seal member 30 clears the cylindrical surface 77, because the outer diameter of the section 77 is smaller than the normal inside diameter of the annular seal member 30, until the seal member 30 reaches the smaller base 78 of the tapered section 75 and is gradually outwardly radially urged by the tapering section 75 until the seal member 30 reaches the larger base 79 of the transition section 75 to permit the annular seal member 30 to slide down the cylindrical section 76 into its final position as illustrated in FIG. 1, such outward radial press-fitting of the seal member 30 on the stem section 76 causing the seal member 30 to be radially compressed between the large and small bases 34 and 33 thereof to further provide good sealing engagement on the valve stem 24 and maintain its sealing engagement with the retainers 28 and 29.

Thus, the seal sub-assembly 27 is moved down the stem 24 of the valve member 23 until the retainer 29 has its surface 63 mate with the end 60 of the lip seal means 54 and the metal diaphragm 45 is disposed against the seal diaphragm 54.

When the valve member 23 is subsequently disposed in the chamber 22, the metal diaphragm 45 engages against the annular surface 48 of the housing 21 and has its peripheral end 49 disposed against the annular seal member 50.

Thereafter, the cover member 42 is disposed on the housing means 21 and is bolted thereto by suitable bolts (not shown) to cause the surface 52 thereof to hold the metal diaphragm 45 against the surface 48 of the housing means 21 and maintain the peripheral end 49 of the metal diaphragm 45 in sealing engagement with the annular seal means 50 as illustrated.

The adjusting screws 40 of the cover member 42 are then adjusted to provide sufficient force on the seal subassembly 27 to maintain the lip seal means 60 in good sealing engagement with the stem 24 of the valve member 23.

In this manner, it can be seen that the valve stem 24 and valve member 23 is adapted to be rotated in unison in the housing means 21 because the seal means 26 permits such rotational movement therebetween while providing the main sealing function through its polymeric seal diaphragm 54 that maintains sealing engagement against the stem 24 of the valve member 23 and the surface 58 of the housing means 21, the seal path provided by the annular seal member 30, metal diaphragm 45 and annular seal member 50 merely being at this time a backup sealing means to the polymeric sealing diaphragm 54 as the polymeric diaphragm 54 is the first seal means that closes the valve chamber 22 from the exterior of the valve construction 20.

However, as previously set forth, should an adverse fire or heat situation cause the burning up and/or other destruction of the polymeric seal means 54 of the valve construction 20, the seal provided by the annular seal member 30, metal diaphragm 45 and annular seal member 50 provides a substantially fire-safe top seal arrangement so that fluid leakage from the chamber 22 to the exterior of the valve construction 20 cannot take place after an adverse fire or the like which might cause the fluid being controlled by the valve means 20 to feed such an adverse fire condition, such as when the fluid controlled by the valve construction 20 is a petroleum product or the like.

In any event, it can be seen that the improved seal means 26 of this invention not only provides conventional sealing of the valve chamber 22 from the exterior of the valve construction 20 with the polymeric seal means 54, but also the seal means 26 provides a backup seal means thereto should the seal means 54 be destroyed in any manner, the backup seal means 30, 45 and 50 actually providing a fire-safe seal means for the reasons previously set forth.

Therefore, it can be seen that this invention not only provides an improved valve construction, but also this invention provides an improved method of making such a valve construction.

While the form and method of this invention now preferred have been illustrated and described as required by the Patent Statute, it is to be understood that other forms and method steps can be utilized and still fall within the scope of the appended claims.

What is claimed is:

1. In a valve construction comprising a housing means having a valve chamber therein, a valve means rotatably carried by said housing means in said chamber thereof and having a valve stem extending from said chamber, and seal means carried by said housing means to prevent leakage from said chamber to the exterior of said housing means and having an annular seal member sealing against and completely around said stem while permitting rotational movement therebetween, the improvement wherein said seal means comprises a pair of annular metallic retainers press-fitted together in telescoping relation and holding said annular seal member therebetween in compressed sealed relation therewith, said retainers having annular facing surfaces compressing said seal member therebetween, and said facing surfaces being disposed to generally taper toward each other in a direction substantially transverse to and away from said stem.

2. A valve construction as set forth in claim 1 wherein said seal member has a generally trapezoidal cross-sectional configuration defining a large base interconnected to a small base by angled sides with said larger base thereof engaging said stem and said angled sides thereof engaging said facing surfaces of said retainers.

3. A valve construction as set forth in claim 2 wherein one of said retainers has another annular surface that is substantially concentric with and faces toward said stem, said small base of said seal member engaging said other annular surface.

4. A valve construction as set forth in claim 3 wherein said seal member is also under compression between said bases thereof.

5. A valve construction as set forth in claim 3 wherein said other annular surface of said one retainer intersects said tapering surface thereof, the other of said retainers having another annular surface thereof facing said other surface of said one retainer and intersecting with its respective tapering surface.

6. A valve construction as set forth in claim 5 wherein part of said seal member adjacent said small base thereof is compressed and held between said facing other surfaces of said retainers.

7. A valve construction as set forth in claim 5 wherein said seal means comprises a metal diaphragm having an inner annular peripheral portion and an outer annular peripheral portion, said inner annular peripheral portion of said metal diaphragm being held in press-fit relation between said other facing surfaces of said retainers and said outer annular peripheral portion thereof extending generally transversely away from said stem.

8. A valve construction as set forth in claim 7 wherein said housing means has an annular seal surface generally concentric to said stem and spaced outwardly therefrom, said seal means comprising another annular seal member carried by said annular seal surface, said outer annular peripheral portion of said metal diaphragm sealing engaging said other annular seal member.

9. A valve construction as set forth in claim 8 wherein said housing means comprises a cover member having an annular surface that engages said outer annular peripheral portion of said metal diaphragm and holds the same in annular sealing engagement with said other annular seal member.

10. A valve construction as set forth in claim 9 wherein said seal means comprises a sealing diaphragm having an inner annular peripheral portion disposed in sealing relation against and completely around said stem intermediate said chamber and said annular seal member that engages said stem and an outer annular peripheral portion sealing engaging said housing means generally concentrically about said stem in spaced relation therefrom and inboard of said other annular seal member.

11. A valve construction as set forth in claim 1 wherein said seal means comprises a metal diaphragm having an inner annular peripheral portion and an outer annular peripheral portion, said inner annular peripheral portion of said metal diaphragm being held in press-fit relation between said retainers and said outer annular peripheral portion thereof extending generally transversely away from said stem.

12. A valve construction as set forth in claim 11 wherein said housing means has an annular seal surface generally concentric to said stem and spaced outwardly therefrom, said seal means comprising another annular seal member carried by said annular seal surface, said outer annular peripheral portion of said metal diaphragm sealing engaging said other annular seal member.

13. A valve construction as set forth in claim 1 wherein said stem has means placing said annular seal member under radial compression.

14. A valve construction as set forth in claim 13 wherein said means of said stem comprises a section of said stem that has an outside diameter larger than the normal inside diameter of said annular seal member.

15. A valve construction as set forth in claim 14 wherein said section of said stem comprises a cylindrical section of said stem.

16. A valve construction as set forth in claim 15 wherein said stem has another cylindrical section disposed outboard of the first-named cylindrical section, said other section having an outside diameter smaller than the normal inside diameter of said annular seal member.

17. A valve construction as set forth in claim 16 wherein said stem has a frustoconical transition section intermediate and interconnecting said cylindrical sections together.

18. In a seal means for a valve construction wherein said valve construction comprises a housing means having a valve chamber therein and a valve means rotatably carried by said housing means in said chamber thereof and having a valve stem extending from said chamber, said seal means being adapted to be carried by said housing means to prevent leakage from said chamber to the exterior of said housing means and having an annular seal member adapted to seal against and completely around said stem while permitting rotational movement therebetween, the improvement wherein said seal means comprises a pair of annular metallic retainers press-fitted together in telescoping relation and holding said annular seal member therebetween in compressed sealed relation therewith, said retainers having annular facing surfaces compressing said seal member therebetween, and said facing surfaces being disposed to generally taper toward each other in a direction substantially transverse to and away from said stem once said seal means is in its installed position in said valve construction, said press-fitted retainers with said compressed seal member therebetween defining said seal means as a self-contained unitary structure.

19. A seal means as set forth in claim 18 and further comprising a metal diaphragm having an inner annular peripheral portion and an outer annular peripheral portion, said inner annular peripheral portion of said metal diaphragm being held in press-fit relation between said retainers and said outer annular peripheral portion thereof extending radially outwardly from said retainers, said metal diaphragm comprising said unitary structure.

20. A seal means as set forth in claim 18 wherein said seal member has a generally trapezoidal cross-sectional configuration defining a large base interconnected to a small base by angled sides with said large base thereof being adapted to engage said stem and said angled sides thereof engaging said facing surfaces of said retainers.

21. A seal means as set forth in claim 20 wherein one of said retainers has another annular surface that is substantially concentric with and faces toward said stem with seal means in said installed position, said small base of said seal member engaging said other annular surface, and said seal member being adapted to be under compression between said bases thereof once said seal means is in its installed position.

22. A seal means as set forth in claim 21 wherein said other annular surface of said one retainer intersects said tapering surface thereof, the other of said retainers having another annular surface thereof facing said other surface of said one retainer and intersecting with its respective tapering surface.

23. A seal means as set forth in claim 22 wherein part of said seal member adjacent said small base thereof is compressed and held between said facing other surfaces of said retainers.

24. A seal means as set forth in claim 22 and further comprising a metal diaphragm having an inner annular peripheral portion and an outer annular peripheral portion, said inner annular peripheral portion of said metal diaphragm being held in press-fit relation between said other facing surfaces of said retainers and said outer annular peripheral portion thereof extending radially outwardly from said retainers, said metal diaphragm comprising said unitary structure.

25. In a valve construction comprising a housing means having a valve chamber therein a valve means rotatably carried by said housing means in said chamber thereof and having a valve stem extending from said chamber, and seal means carried by said housing means to prevent leakage from said chamber to the exterior of said housing means and having an annular seal member sealing against and completely around said stem while permitting rotational movement therebetween, the improvement wherein said seal means comprises a pair of annular metallic retainers press-fitted together in telescoping relation and holding said annular seal member therebetween in compressed sealed relation therewith, said retainers having annular facing surfaces compressing said seal member therebetween, said facing surfaces being disposed to generally taper toward each other in a direction substantially transverse to and away from said stem, said seal member having a generally trapezoidal cross-sectional configuration defining a large base interconnected to a small base by angled sides with said larger base thereof engaging said stem and said angled sides thereof engaging said facing surfaces of said retainers, one of said retainers having another annular surface that is substantially concentric with and faces toward said stem, said small base of said seal member engaging said other annular surface, said other annular surface of said one retainer intersecting said tapering surface thereof with the other of said retainers having another annular surface thereof facing said other surface of said one retainer and intersecting with its respective tapering surface, said seal means comprising a metal diaphragm having an inner annular peripheral portion and an outer annular peripheral portion, said inner annular peripheral portion of said metal diaphragm being held in press-fit relation between said other facing surfaces of said retainers and said outer annular peripheral portion thereof extending generally transversely away from said stem, said housing means having an annular seal surface generally concentric to said stem and spaced outwardly therefrom, said seal means comprising another annular seal member carried by said annular seal surface, said outer annular peripheral portion of said metal diaphragm sealingly engaging said other annular seal member, said housing means comprising a cover member having an annular surface that engages said outer annular peripheral portion of said metal diaphragm and holds the same in annular sealing engagement with said other annular seal member, and said seal means further comprising a sealing diaphragm having an inner annular peripheral portion disposed in sealing relation against and completely around said stem intermediate said chamber and said annular seal member that engages said stem and an outer annular peripheral portion sealingly engaging said housing means generally concentrically about said stem in spaced relation therefrom and inboard of said other annular seal member, said sealing diaphragm having said inner peripheral portion thereof defining an annular lip seal against said stem.

* * * * *